United States Patent
Borowiec et al.

(10) Patent No.: US 11,374,846 B1
(45) Date of Patent: Jun. 28, 2022

(54) LIN MASTER TESTING DEVICE

(71) Applicant: Aptiv Technologies Limited, St. Michael (BB)

(72) Inventors: Maciej Borowiec, Dublin (IE); Przemyslaw Czachowski, Dublin (IE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/650,838

(22) Filed: Feb. 11, 2022

(30) Foreign Application Priority Data

Feb. 17, 2021 (EP) .................................. 21157672

(51) Int. Cl.
*H04L 43/50* (2022.01)
*H04L 12/40* (2006.01)

(52) U.S. Cl.
CPC .............. *H04L 43/50* (2013.01); *H04L 12/40* (2013.01)

(58) Field of Classification Search
None
See application file for complete search history.

(56) References Cited

U.S. PATENT DOCUMENTS

| | | | |
|---|---|---|---|
| 5,862,354 A | 1/1999 | Curiger et al. | |
| 9,160,559 B2 * | 10/2015 | Barrenscheen | H04L 12/403 |
| 10,331,610 B2 * | 6/2019 | Samuel | G06F 13/4295 |
| 2018/0287664 A1 | 10/2018 | Laifenfeld et al. | |
| 2019/0250610 A1 * | 8/2019 | Luo | G05D 1/0246 |
| 2020/0136858 A1 * | 4/2020 | Rotti | H04L 63/0464 |
| 2022/0070018 A1 * | 3/2022 | Paleti | G06F 1/3215 |

FOREIGN PATENT DOCUMENTS

| | | |
|---|---|---|
| CN | 110597225 A | 12/2019 |
| EP | 2816487 A1 | 12/2014 |
| EP | 3311296 A1 | 4/2018 |
| JP | 2005277994 A | 10/2005 |
| JP | 2007142694 A | 6/2007 |
| JP | 4157064 B2 | 9/2008 |

OTHER PUBLICATIONS

"Extended European Search Report", EP Application No. 21157672.3, dated Sep. 9, 2021, 5 pages.

* cited by examiner

*Primary Examiner* — Anh Vu H Ly
(74) *Attorney, Agent, or Firm* — Sawtooth Patent Group PLLC

(57) ABSTRACT

Testing device for testing a LIN master device having a plurality of LIN channels. The device has a plurality of LIN channel terminals, each for connection to a LIN bus associated with one of the LIN channels of the LIN master device. One or more UART circuits are communicatively coupled to the plurality of LIN channel terminals for receiving and transmitting signals on the respective LIN bus. A controller is communicatively coupled to the one or more UART circuits and is configured to implement a LIN slave state machine on each of the LIN busses using the one or more UART circuits for emulating LIN slave behaviour.

15 Claims, 5 Drawing Sheets

LIN MASTER TESTING DEVICE

CROSS-REFERENCE TO RELATED APPLICATION

This application claims priority to European Patent Application Number 21157672.3, filed Feb. 17, 2021, the disclosure of which is hereby incorporated by reference in its entirety herein.

BACKGROUND

Test automation is widely used in the automotive industry for Independent Test & Verification (IT&V) and Product Test & Validation (PT&V) purposes. This particularly applies to the testing of communication buses, such as Local Interconnect Network (LIN), Controller Area Network (CAN), and FlexRay (FR) busses, because they form a critical part of product functionality.

LIN bus is one of the simplest and cheapest communication buses used in automotive applications. As such, LIN clusters are widely used for a large number of control functions in a vehicle, such as door clusters for controlling mirror and seat adjustments and comfort clusters for controlling air conditioning and fan settings. Each LIN cluster includes a number of slave nodes, each associated with a specific control or function, which are in turn connected to a master node by a single-wire, serial LIN bus. The master node or device may have more than one LIN channel, each for serving a different LIN bus. For example, FIG. 1 shows an illustrative topology of LIN busses 1a-e connected to a Body Controller Module (BCM) 2. As shown, each of the five LIN bus 1a-e is associated with a cluster of LIN slave nodes 3, and the BCM 2 has five LIN channels 4a-e each connected to one of the LIN busses 1a-e.

In modern vehicles, BCMs often include LIN masters having ten or more LIN channels 4. This creates challenges during post-production testing of these modules because of the need to test all LIN buses simultaneously. For instance, in a real-world example, a BCM 2 may have twelve LIN channels 4, and the production throughput may require three BCM's 2 to be tested in each test cycle at each test station. In this situation, each test system may need to support thirty-six independent LIN channels 4. Unfortunately, conventional LIN interfaces contain no more than four channels per device, with each interface costing around $830. Accordingly, to support all thirty-six channels, the required nine interfaces may cost $7.5 k. Once multiplied by the number of testing stations, the cumulative cost is significant. At the same time, the nine LIN interfaces in each station can occupy a considerable amount of space and require connection to a single computer, typically by USB or PCIe. This creates its own technical issues in the high-noise environment associated with validation testing facilities.

Although System-On-Chip (SoC) modules having multiple LIN channels are commercially available, these are always for master device applications, such as for use in BCMs. Consequently, such multi-channel master device interfaces cannot be used for replicating the operations of the slave nodes during master device testing.

Accordingly, there is a need to develop a cost effective and simple multiple LIN channel interface which supports slave functionality.

SUMMARY

The present disclosure relates to a testing device and software for operating the same. The present disclosure is particularly relevant to multi-channel LIN master testing devices, and testing and validation systems for automotive computing units utilising UART interfaces to emulate slave node behaviour. According to a first aspect, there is provided a testing device for testing a Local Interconnect Network, LIN, master device having a plurality of LIN channels, including: a plurality of LIN channel terminals, each for connection to a LIN bus associated with one of the LIN channels of the LIN master device; one or more Universal Asynchronous Receiver/Transmitter, UART, circuits communicatively coupled to the plurality of LIN channel terminals for receiving and transmitting signals on the respective LIN bus; and a controller communicatively coupled to the one or more UART circuits and configured to implement a LIN slave state machine on each of the LIN busses using the one or more UART circuits for emulating LIN slave behaviour.

In this way, a cost effective and simple multiple LIN channel testing device is provided which can emulate LIN slave node functionality on each of the LIN busses. By utilising UART interfaces and replicating slave node behaviour through these interfaces by implementing LIN slave state machines in software controlling them, a large number of LIN channels can be supported simultaneously. This thereby allows testing procedures to be applied for testing multiple channels of a master node device simultaneously in the same testing cycle. Furthermore, the use of UART interfaces, which are available commercially as an integrated circuit chip, provides for a cost effective and compact assembly.

In embodiments, each LIN slave state machine transitions from an idle state to a LIN frame detection state in response the detection of a break field on its respective LIN bus. In this way, the behaviour of the LIN slave state machine may replicate a normal operating response of a LIN slave node.

In embodiments, the break field is identified when nine or more consecutive dominant bits are present on the LIN bus.

In embodiments, the one or more UART circuits are configured for identifying nine or more consecutive dominant bits present on a LIN bus.

In embodiments, the controller includes a main timer and is configured to implement timeout timers for timing signal fields on each LIN bus using the main timer, wherein each timeout timer is reset after a transition at each state of the respective LIN slave state machine. In this way, the controller may be used to determine the validity of received frames with a LIN frame specification based on the bit-time of fields within the frame.

In embodiments, the controller is configured to identify a framing error in response to the timeout timer on a respective LIN bus being shorter than a lower threshold associated with the current state of the respective LIN slave state machine, and wherein the respective LIN slave state machine transitions to an idle state in response to the detection of the framing error.

In embodiments, the controller is configured to identify a timeout error in response to the timeout timer on a respective LIN bus being longer than a higher threshold associated with the current state of the respective LIN slave state machine, and wherein the respective LIN slave state machine transitions to an idle state in response to the detection of the timeout error.

In embodiments, each LIN slave state machine includes an identifier reception state for receiving an identifier on the respective LIN bus, wherein the LIN slave state machine transitions to one of a data receive state and a data transmit state based on the received identifier.

In embodiments, the controller is configured to identify a parity error in response to invalid parity bits being received in the identifier on a respective LIN bus, wherein the respective LIN slave state machine transitions to an idle state in response to the detection of the parity error.

In embodiments, the controller is configured to receive data when a LIN state machine for a respective LIN bus is in the data receive state, and wherein the controller is configured to identify a checksum error in response to an invalid checksum being in the received data, wherein the LIN slave state machine transitions to an idle state in response to the detection of the checksum error.

In embodiments, the controller is configured to transmit data when a LIN state machine for a respective LIN bus is in the data transmit state.

In embodiments, each of the plurality of LIN channel terminals includes a LIN transceiver, and wherein the LIN transceivers are coupled to Rx and Tx lines of the one or more UART circuits for receiving and transmitting signals on the respective LIN bus.

In embodiments, the LIN transceivers are configured to loopback signals received on their Tx line to their Rx line, and wherein the controller is configured to identify a readback error in response to a received signal on the Rx line not corresponding to a transmitted signal on the Tx line.

In embodiments, the one or more UART circuits include a MAX14830 chip. Advantageously, the MAX14830 chip provides four UART channels on each chip, thereby minimising the total number of chips required on the supporting printed circuit board. At the same time, the chip has an SPI interface for providing a high throughput and provides for the detection of a break signal.

In embodiments, the device includes four MAX14830 chips. In embodiments, the device is provided as a rack-mounted card. In embodiments, the device includes a second module, the second module having a second plurality of LIN channel terminals, one or more second UART circuits communicatively coupled to the plurality of LIN channel terminals, and a second controller communicatively coupled to the one or more second UART circuits and configured to implement LIN slave state machines on each LIN bus associated with the second plurality of LIN channel terminals.

In embodiments, the testing device further includes an ethernet module coupled to the controller for transmitting test data to a remote testing computer. In this way, the reliable transfer of test data to a remote testing computer may be facilitated, even in noisy testing environments. Furthermore, this allows a number of testing devices to communicate with a single testing computer.

According to a second aspect, there is provided a non-transitory computer readable medium having stored thereon software instructions for a testing device to test a Local Interconnect Network, LIN, master device having a plurality of LIN channels, wherein the software instructions, when executed by a controller in the testing device, implements LIN slave state machines on LIN busses associated with the LIN channels of the LIN master device for emulating LIN slave behaviour thereon, wherein the software instructions implement the LIN slave state machines through one or more Universal Asynchronous Receiver/Transmitter, UART, circuits which are communicatively coupled to the controller, and wherein the UART circuits are communicatively coupled to a plurality of LIN channel terminals for receiving and transmitting signals on the respective LIN buses.

BRIEF DESCRIPTION OF THE DRAWINGS

Illustrative embodiments are now be described with reference to the accompanying drawings in which.

DETAILED DESCRIPTION

In embodiments, a testing device is provided in which the physical layer (OSI Level 1) of LIN buses is implemented using commonly available LIN transceivers, and the LIN buses on the data link layer (OSI Level 2) is implemented using UART interfaces to emulate LIN slave node behaviour. This capitalises on the similarity between the LIN communication protocol and a classic UART communication protocol in which there is one stop bit and no parity bit.

Figure 1:
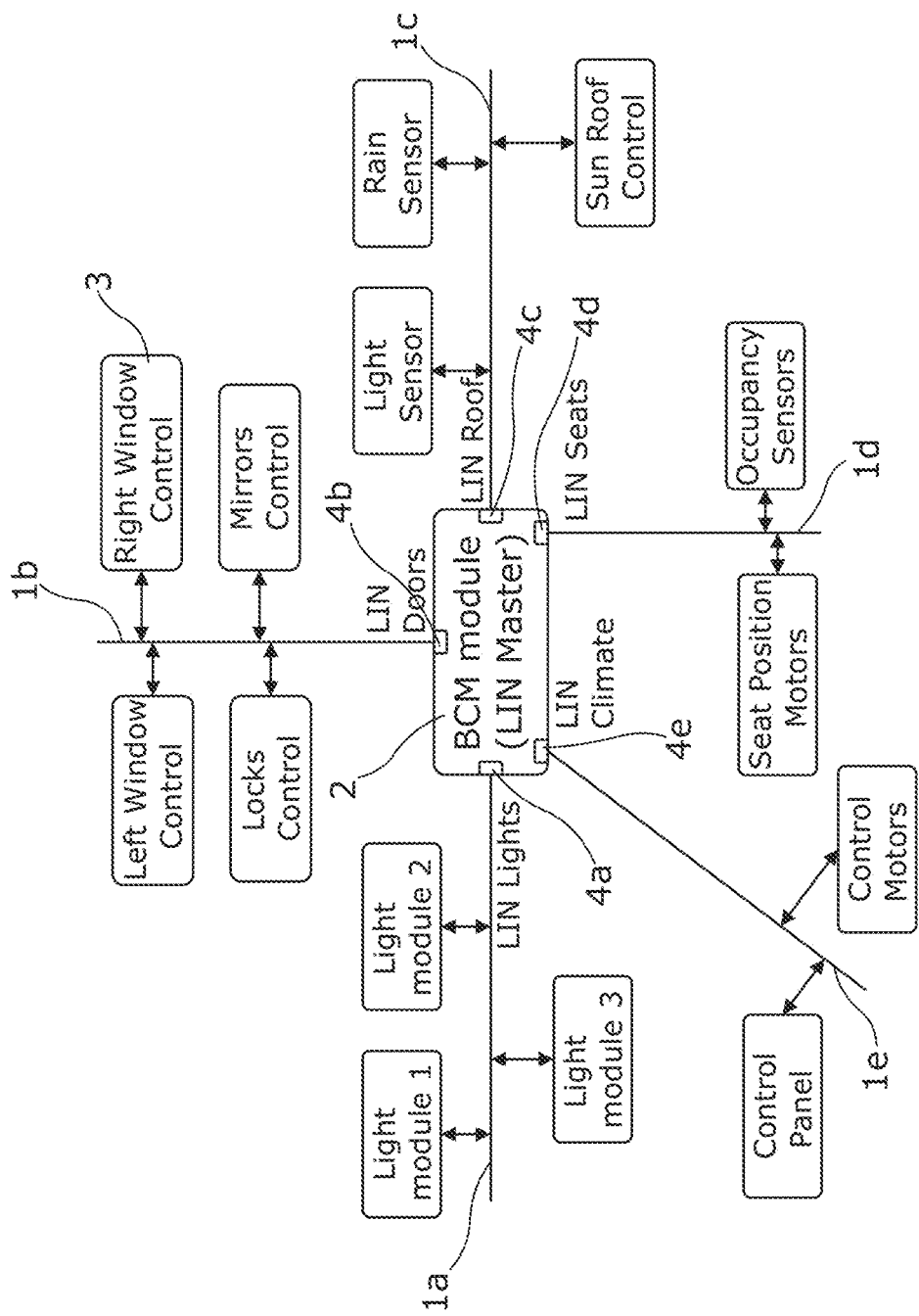
FIG. 1 is a schematic illustration of a LIN bus topology of an example Body Control Module.
Figure 2:
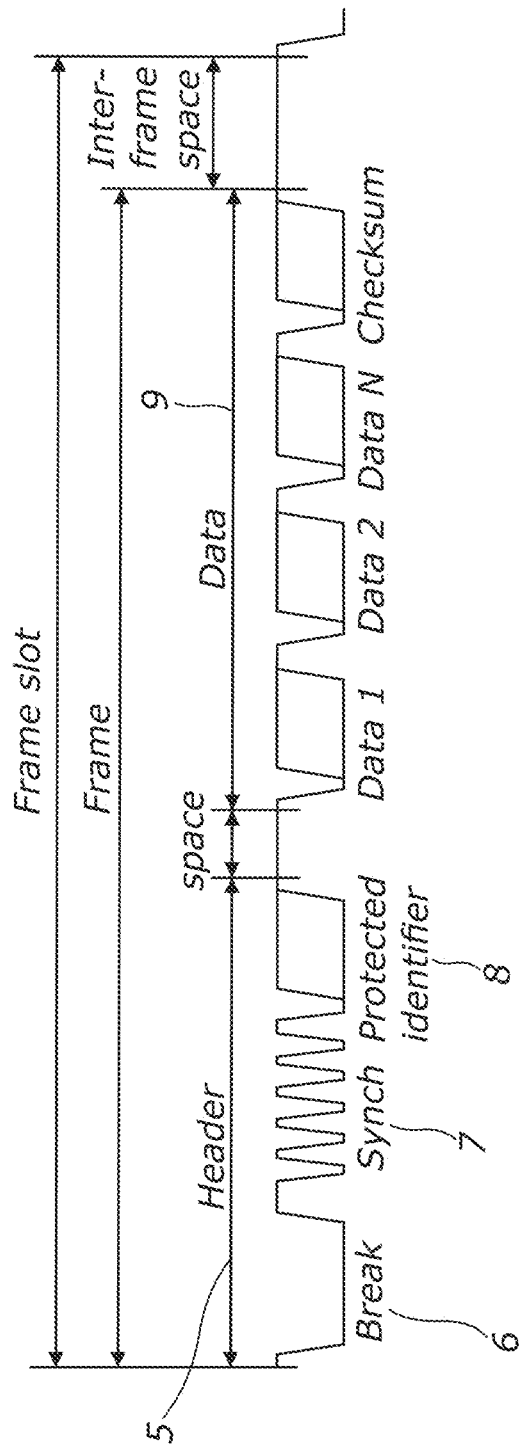
FIG. 2 shows a LIN bus message frame structure according to the LIN bus protocol.

In this connection, FIG. 2 shows an example LIN bus message frame under the LIN communication protocol. Each LIN bus message frame begins with a header 5 transmitted by the master which starts with a break signal 6, followed by sync field 7 for synchronising the slave nodes to the master clock, and an identifier 8 for identifying which slave nodes the header 4 is directed to. Following the header 5, there is a data field 9 which is used to either transmit instructions from the master 2 to the slave 3 or a response from the slave 3 to the master 2. Accordingly, the break signal 6 transmitted by the master 2 is used to identify the start of each LIN frame.

Unlike the LIN protocol, the UART protocol does not include a break field 6. As such, conventional UART controllers can detect a break field as a framing error. A framing error cannot be used to designate a start of frame because using this as a trigger does not guarantee that at least 9 consecutive dominant bits have been present on the bus. However, in embodiments, the behaviour of a LIN slave node can be implemented by a UART interface and controller CPU using a software-controlled SPI interface. As such, a software implementation of LIN slave state machine is provided.

Figure 3:
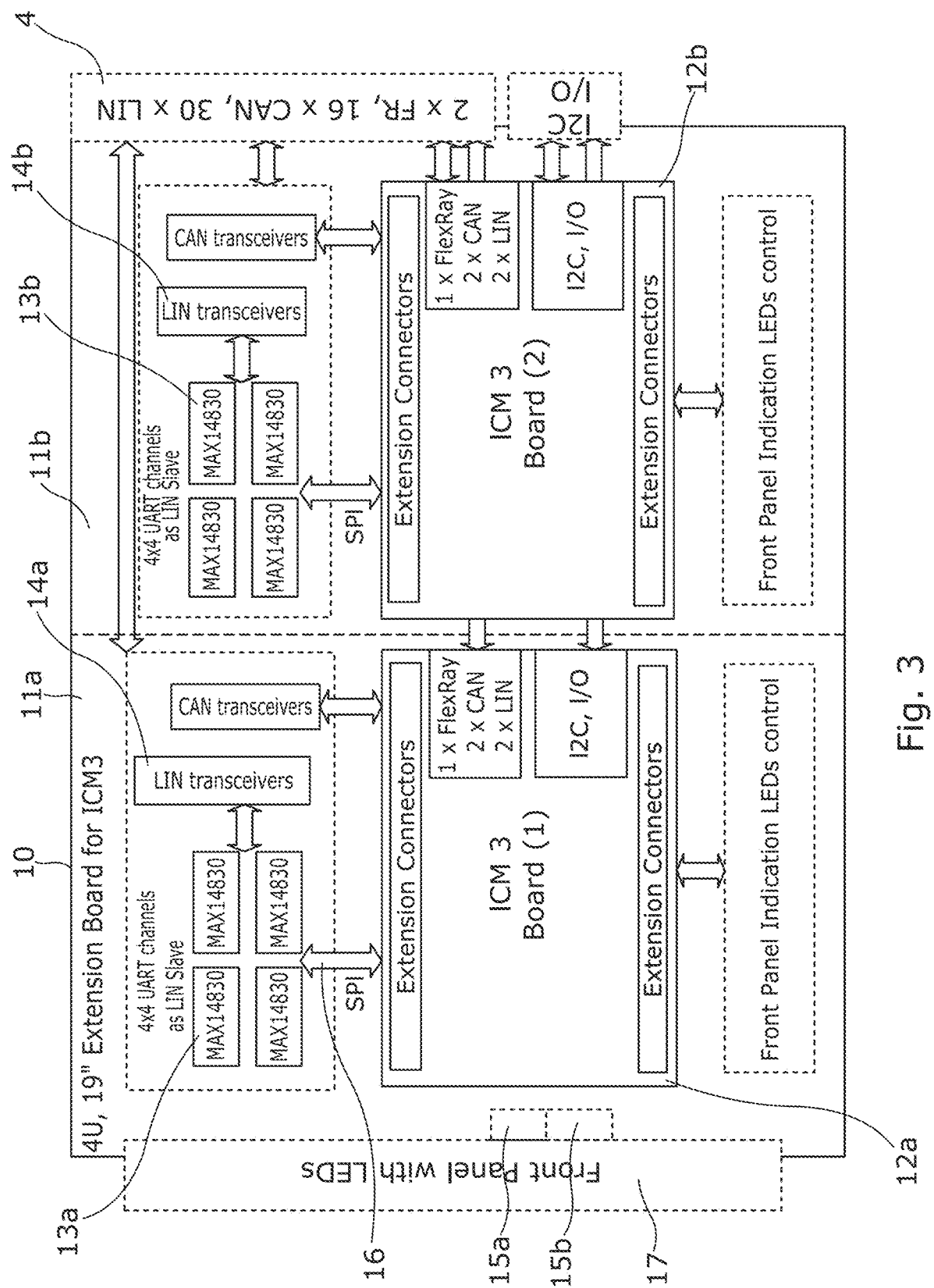
FIG. 3 is a schematic illustration of a testing device according to an illustrative embodiment.

FIG. 3 shows a schematic illustration of a testing device according to an illustrative embodiment. In this embodiment, an extension board 10 is provided as a rack-mounted card having thirty LIN channels 4, as well as CAN and FR channels, is provided. Each extension board includes two Intelligent Communication Modules 11a-b, with each module 11a-b having a CPU 12a-b and four MAX14830 chips 13a-b. In each module 11a-b, the physical layer of the LIN channels 4 is implemented using LIN transceivers 14a-b and provides electrical isolation of the LIN buses 1a-e from the power supply powering the Intelligent Communication Modules 11a-b.

The Intelligent Communication Modules 11a-b communicate with a Testing Computer (not shown) through an Ethernet bus (100BaseTX) embedded in each communication module. The modules are connected through Ethernet ports 15a and 15b, respectively. The Ethernet bus thereby allows a large number of Intelligent Communication Modules 11a-b to be easily connected to a single Testing Computer. The provision of an Ethernet connection is advantageous over multiple USB connections since USB cables are limited to a maximum of 5 m, and Ethernet offers improved reliability in noisy conditions.

Each MAX14830 chip 13*a-b* provides four UART busses, each of which can function as a LIN channel 4. As four MAX14830 chips 13*a-b* are provided on each Intelligent Communication Module 11*a-b*, a maximum total of sixteen LIN channels may be provided per module 11*a-b*. In this embodiment, only fifteen LIN channels are provided per module 11*a-b*. The MAX14830 chips 13*a-b* of each module share the same SPI bus 16 for communication with their respective CPUs 12*a-b*. Within the SPI bus 16, the Chip Select line is demultiplexed from three CPU CS lines to four separate CS lines, one for each MAX14830 chip 13*a-b*. The MAX14830 chips 13*a-b* also provide two CAN busses per chip which, in some embodiments, may be used to test up to sixteen CAN channels. In embodiments, the MAX14830 UART chips 13*a-b* may also include additional free I/O pins which may be used for termination resistor enabling.

The MAX14830 UART chips 13*a-b* provide for the detection of a break field, corresponding to dominant state (e.g., a change in voltage) for more than 9-bit times. This facilitates the emulation of the detection of a break signal by a LIN slave node.

The LIN transceivers 14*a-b* are configured to perform loopback of the transmission, Tx, line signals on the receiver, Rx, line. That is, as UART is full duplex, each UART bus has both Tx and Rx lines. The LIN transceivers 14*a-b* are configured to loop back the transmission of frame data characters transmitted on the Tx line so that the same data characters are to be received on the Rx line. Instances where different data characters are detected may thereby be used to identify bus interference.

In this embodiment, a MPC5748G CPU 12*a-b* is used as a controller for the UART circuits in each module 11*a-b*. The MPC5748G CPU provides a powerful SPI controller which allows all SPI transfers to the channels to be handled by a single advanced DMA transfer to SPI controller. This thereby saves CPU time. In addition, the MPC5748G CPU provides an Ethernet interface for Ethernet ports 15*a-b* to communicate with the testing computer.

Figure 4:
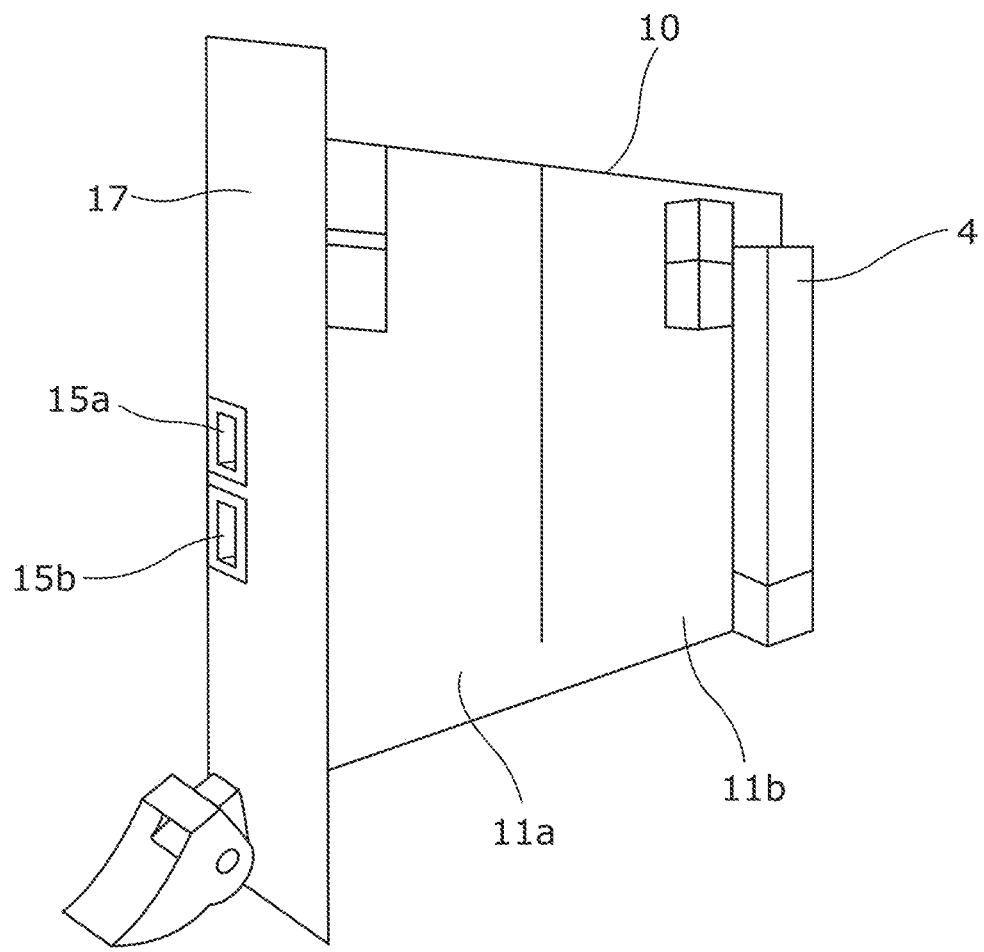
FIG. 4 is a perspective view of the extension board shown in FIG. 3.

FIG. 4 shows a perspective view of a physical embodiment of the extension board shown in FIG. 3. As shown, the extension board 10 is provided as a rack mounted card, with a front panel 17 providing a number of LED indicators, the Ethernet ports 15*a-b*, and a power switch, and the rear of the panel providing the terminals for the LIN channels 4, as well as the I²C, FR and CAN busses.

Figure 5:
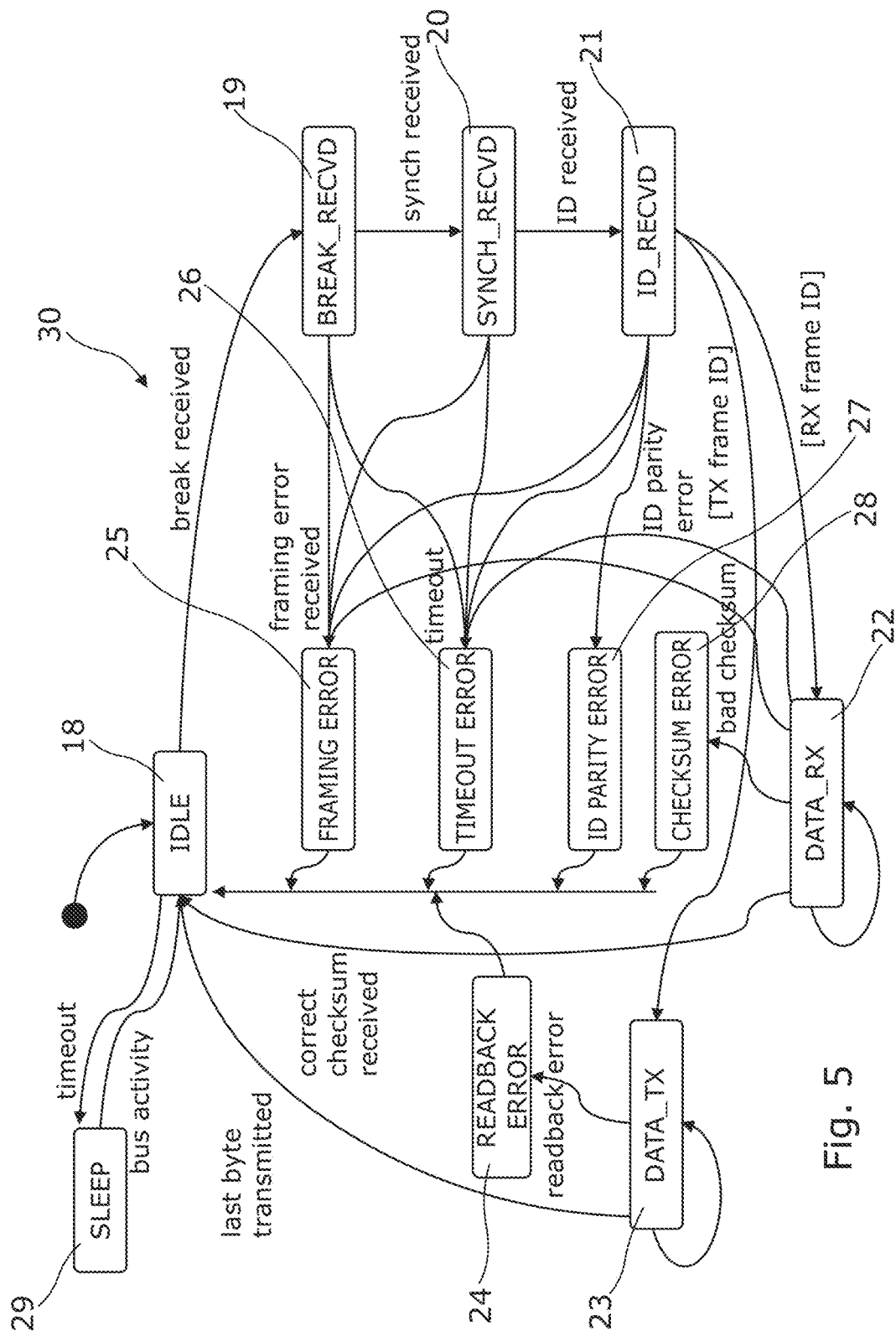
FIG. 5 is a schematic illustration of a state machine according to an illustrative embodiment.

The LIN slave behaviour is software-implemented by the CPU 12*a-b*, in conjunction with the MAX14830 UART interfaces 13*a-b*, in each of the Intelligent Communication Modules 11*a-b*. FIG. 5 shows the LIN slave state machine 30 implemented on each LIN channel 4.

In this connection, the MAX14830 chips 13*a-b* are operated on a byte-by-byte manner to facilitate the detection of errors during frame reception and transmission. Each CPU 12*a-b* also implements a timeout timer to allow the detection of errors according to LIN specification, as well as identify transitions into a sleep state. The timer is restarted on each bus activity. As mentioned above, the LIN transceivers 14*a-b* perform loopback of the Tx line signals on the Rx line, thereby allowing the CPUs 12*a-b* to perform readback for error detection of interference on the LIN bus.

As shown in FIG. 5, the state machine 30 begins from an idle state 18, with the detection of a break signal in step 19 on a LIN channel 4. In this embodiment, this is detected by the UART interfaces 13*a-b* with the identification of nine or more consecutive dominant bits present on the respective LIN bus. Where a shorter break is detected, this can be attributed to a framing error in step 25, with the state machine reverting to idle 18. Where a longer break than a LIN break signal is detected, for example more than 20-bit times, this may be attributed to a timeout error in step 26.

Upon detection of a break signal meeting LIN protocol specifications, the respective CPU 12*a-b* is then used to detect the presence of a synchronisation, SYNCH, signal in step 20. Under the LIN protocol, the SYNCH signal is to be an 8-bit field with a value of 0x55. Again, a shorter signal or a longer signal can be attributed to a framing or timeout error in steps 25 or 26, respectively.

If a SYNCH signal meeting LIN protocol specification is detected, the respective CPU 12*a-b* then detects the presence of an identifier in step 21, including a 6-bit ID signal followed by 2 parity bits. Again, a shorter signal or a longer signal can be attributed to a framing or timeout error in steps 25 or 26, respectively, and if the CPU 12*a-b* determines an invalid ID signal based on the parity bits, then a parity error may be determined in step 27.

If a valid identifier is received, this is identified by the CPU 12*a-b* as either designating a receive data field in step 22 or a transmit data field in step 23. In the case of a receive data field (step 22), data from the master node on the respective LIN channel is read, and the checksum field at the end of the LIN frame is validated to identify any signal errors in step 28. In the case of a transmit data field (step 23), the CPU 12*a-b* generates a data transmission on the LIN bus channel to emulate the slave node, which is transmitted back on Rx line as a readback signal for error checking in step 24.

The identification of an error or the valid receipt/transmission of a bus signal reverts the state machine back to the idle state in step 18. If the respective LIN channel is inactive for an extended period, the respective CPU 12*a-b* may time out and place the channel in a sleep mode in step 29. Activity on the bus may then wake the channel from the sleep mode.

As all state transitions are performed by software on the CPUs 12*a-b*, they are subject to timing jitter. In practice, this manifest when transmitting data on the LIN channels 4. However, in testing this jitter was within range 0-50 µs and hence was well within tolerances of the LIN protocol specification.

With the above arrangement, a testing device is provided which can be used to test multiple slave LIN channels during the same testing cycle. Furthermore, the assembly is much more cost effective than conventional LIN interfaces. For example, based on the component costs, the above illustrative example extension board device may cost around $880 per unit to implement. This equates to a cost of around $29 per LIN channel for each of the thirty supported channels. In comparison, as discussed in the introduction, a conventional 4-channel LIN interface costs around $830, or $208 per LIN channel. In context of a manufacturing facility which may require, for example, 1000 LIN channels to be tested in each cycle, the cost saving equates to around $179,000. Moreover, each testing device may also provide for CAN and FR interfaces, thereby allowing even greater testing flexibility and additional cost savings.

It will be understood that the embodiments illustrated above shows an application only for the purposes of illustration. In practice, embodiments may be applied to many different configurations, the detailed embodiments being straightforward for those skilled in the art to implement.

What is claimed is:

1. A testing device for testing a Local Interconnect Network, LIN, master device having a plurality of LIN channels, comprising:

a plurality of LIN channel terminals, each for connection to a LIN bus associated with one of the LIN channels of the LIN master device;

one or more Universal Asynchronous Receiver/Transmitter, UART, circuits communicatively coupled to the plurality of LIN channel terminals for receiving and transmitting signals on the respective LIN buses; and a controller communicatively coupled to the one or more UART circuits and configured to implement a LIN slave state machine on each of the LIN busses using the one or more UART circuits for emulating LIN slave behaviour.

2. The testing device according to claim 1, wherein each LIN slave state machine transitions from an idle state to a LIN frame detection state in response the detection of a break field on its respective LIN bus.

3. The testing device according to claim 2, wherein the break field is identified when nine or more consecutive dominant bits are present on the LIN bus.

4. The testing device according to claim 1, wherein the controller comprises a main timer and is configured to implement timeout timers for timing signal fields on each LIN bus using the main timer, wherein each timeout timer is reset after a transition at each state of the respective LIN slave state machine.

5. The testing device according to claim 4, wherein the controller is configured to identify a framing error in response to the timeout timer on a respective LIN bus being shorter than a lower threshold associated with a current state of the respective LIN slave state machine, and
wherein the respective LIN slave state machine transitions to an idle state in response to detection of the framing error.

6. The testing device according to claim 4, wherein the controller is configured to identify a timeout error in response to the timeout timer on a respective LIN bus being longer than a higher threshold associated with a current state of the respective LIN slave state machine, and
wherein the respective LIN slave state machine transitions to an idle state in response to detection of the timeout error.

7. The testing device according to claim 1, wherein each LIN slave state machine comprise an identifier reception state for receiving an identifier on the respective LIN bus, wherein the LIN slave state machine transitions to one of a data receive state and a data transmit state based on the received identifier.

8. The testing device according to claim 7, wherein controller is configured to identify a parity error in response to invalid parity bits being received in the identifier on a respective LIN bus, wherein the respective LIN slave state machine transitions to an idle state in response to detection of the parity error.

9. The testing device according to claim 7, wherein the controller is configured to receive data when a LIN state machine for a respective LIN bus is in the data receive state, and wherein the controller is configured to identify a checksum error in response to an invalid checksum being in the received data, wherein the LIN slave state machine transitions to an idle state in response to detection of the checksum error.

10. The testing device according to claim 7, wherein the controller is configured to transmit data when a LIN state machine for a respective LIN bus is in the data transmit state.

11. The testing device according to claim 1, wherein each of the plurality of LIN channel terminals comprise a LIN transceiver, and wherein each LIN transceivers is coupled to Rx and Tx lines of the one or more UART circuits for receiving and transmitting signals on the respective LIN bus.

12. The testing device according to claim 11, wherein each LIN transceivers is configured to loopback signals received on their Tx line to their Rx line, and wherein the controller is configured to identify a readback error in response to a received signal on the Rx line not corresponding to a transmitted signal on the Tx line.

13. The testing device according to claim 1, wherein the one or more UART circuits comprise a MAX14830 chip.

14. The testing device according to claim 1, further comprising an ethernet module coupled to the controller for transmitting test data to a remote testing computer.

15. A non-transitory computer readable medium having stored thereon software instructions for a testing device to test a Local Interconnect Network, LIN, master device having a plurality of LIN channels,
wherein the software instructions, when executed by a controller in the testing device, implements LIN slave state machines on LIN busses associated with the LIN channels of the LIN master device for emulating LIN slave behaviour thereon,
wherein the software instructions implement the LIN slave state machines through one or more Universal Asynchronous Receiver/Transmitter, UART, circuits which are communicatively coupled to the controller, and wherein the UART circuits are communicatively coupled to a plurality of LIN channel terminals for receiving and transmitting signals on the respective LIN buses.

* * * * *